May 19, 1970     H. B. WEST     3,513,020
METHOD OF IMPREGNATING MEMBRANES
Filed Oct. 12, 1964

IMPREGNATED POLYMER MEMBRANE

INVENTOR,
HIRY B. WEST

BY Watson, Cole, Grindle & Watson
ATTORNEYS

United States Patent Office 3,513,020
Patented May 19, 1970

3,513,020
METHOD OF IMPREGNATING MEMBRANES
Hiry B. West, New York, N.Y., assignor to Leesona Corporation, Warwick, R.I., a corporation of Massachusetts
Filed Oct. 12, 1964, Ser. No. 403,021
Int. Cl. C23c 3/02
U.S. Cl. 117—138.8
4 Claims

ABSTRACT OF THE DISCLOSURE

A method of fabricating a conductive catalytically active electrode for use in an electrochemical cell wherein the catalytically active metal is uniformly distributed throughout a porous plastic membrane is described. The improved method comprises simultaneously flooding one major surface of the membrane with a solution of a metal salt while flooding the second major surface with a reducing agent for the metal salt and causing the metal salt and reducing agent to react to form the catalytic metal.

---

Figure 1:
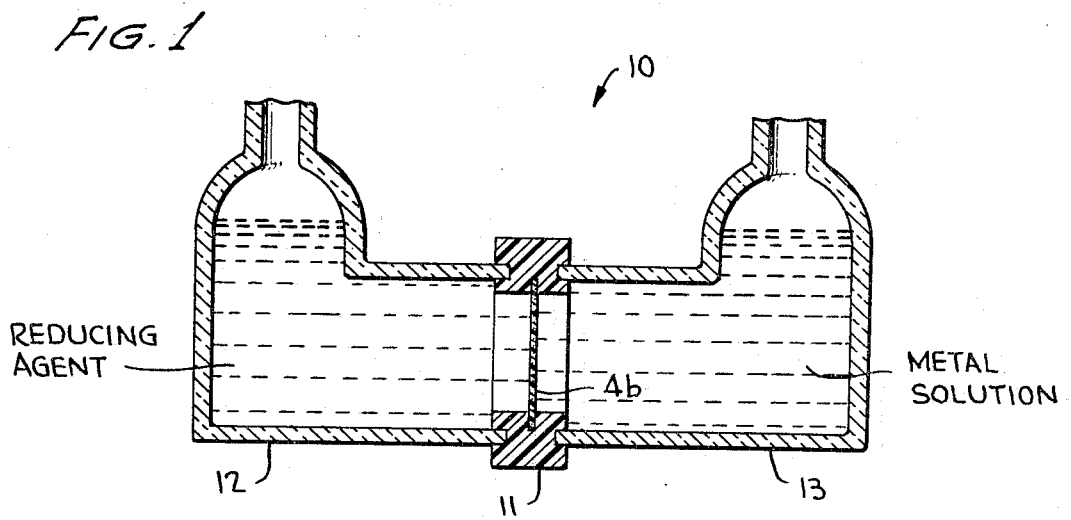

This invention relates to an improved method of impregnating a porous article and to the apparatus therefore. More particularly, the method embraces the uniform coating of the pore surfaces of a plastic membrane which has an average pore diameter of from about 0.2 to 50 microns.

It is known in the art, for example in the construction of fuel cell electrodes, to impregnate porous bodies, such as porous carbon plates, with a catalytically activating metal. The techniques employed vary slightly, depending upon the requirements of the final structure. However, basically, the method comprises heat treating the porous body at a high temperature, i.e., several hundred degrees centigrade, thereafter treating with an aqueous acid solution and impregnating the porous structure with a solution of metal ions by immersing the porous body into the solution. After the carbon body has been immersed in the metal salt solution, the porous body is heated to a high temperature, again several hundred degrees centigrade, to decompose the metal salt leaving the catalytic metal in the structure.

Although the aforesaid methods are reasonably satisfactory for the impregnation of carbon or the like structures which have relatively large pore diameters and which will withstand the necessary high temperatures for the reduction of the metal salts, such methods are not completely satisfactory for impregnating porous plastic membranes having only very minute internal pores, i.e., in the range of about 0.2 to 50 microns in diameter. It has been found that mere immersing of the plastic membrane will not uniformly coat the internal pores, but rather the pores are only coated on the outermost surfaces. If the metal solution is drawn into the pores by vacuum, there is a tendency for the pores to become blocked. Moreover, the plastic membranes are detrimentally affected by the high temperatures necessary for reducing the metal salt solutions.

Accordingly, it is an object of the instant invention to provide a method of impregnating porous plastic membranes having an average pore diameter of from about 0.2 to 50 microns in order that the pore surfaces are substantially completely coated with a catalytically activating metal.

It is another object of this invention to provide a method for impregnating a porous plastic membrane having an average pore diameter of from about 0.2 to 50 microns with a catalytically activating metal, without heating the membrane to high temperatures.

It is another object of this invention to provide a method for depositing a catalytically active metal in a porous polymer membrane, uniformly coating the pore surfaces from major surface to major surface, to provide a membrane having enhanced electrochemical activity and improved endurance, particularly when used in a fuel cell.

These and other objects of the invention will become more apparent from the following detailed description with emphasis being placed upon the illustrative example and drawing.

The objects of the present invention are accomplished by flooding opposite major surfaces of a porous plastic matrix with a solution of the impregnating metal and a solution of a reducing agent for the metal, respectively. The membrane, while in contact with the aforesaid solutions, is subjected to vibration. The chemical reduction of the metal solution occurs in situ and uniformly throughout the membrane. Upon termination of the reduction, the plastic matrix is completely and uniformly coated with the activating metal. Moreover, even the smallest pores of the membrane remain open to the passage of fluid. The resultant membrane, in a fuel cell electrode, has exceptional electrochemical performance characteristics.

Figure 2:

In the accompanying drawing, FIG. 1 illustrates, in cross-section, an apparatus utilized in the impregnation of the porous plastic membranes, and FIG. 2 illustrates, in cross-section, a porous plastic membrane impregnated according to the method of this invention.

More specifically, referring to FIG. 1 of the drawing, the over-all apparatus is designated by numeral 10. Element 11 is a membrane holder constructed from any suitable material such as Teflon, a registered trademark of the Du Pont Corporation designating polytetrafluoroethylene. Elements 12 and 13 are L-shaped half cells constructed from any suitable material such as plastic, glass, or metal to make up the U-shaped full cell. The polymer membrane 4b which is to be impregnated is placed in holder 11 in order that it is in contact with the contents of L-shaped half-cell 12 at one major surface and the contents of L-shaped half-cell 13 at the other major surface. The means employed to vibrate the cell is not shown; however, an ultrasonic vibratory device is eminently suitable.

In the preferred method of operation, both half cells are initially filled with a reducing agent such as 20 percent aqueous hydrazine solution and the polymer membrane is placed in holder 11. A low vacuum is applied alternatively to half-cells 12 and 13 for a period of about 10 minutes to impregnate the membrane with reducing agent. Thereafter, the cell is flushed with water and the process repeated using the metallic salt solution in place of the reducing agent. Again, the cell is flushed with water. After the preliminary wetting of the membrane, one half cell, i.e., half-cell 12, is filled with the activating metal solution; and the second half cell, i.e., half-cell 13, is filled with reducing agent and the full cell vibrated for a period of approximately 10 to 15 minutes. Thereafter, the membrane holder is reversed and the process repeated in order to insure complete and uniform coverage of the pore surfaces with metal. It is to be understood that it is not completely necessary to first flush the polymer membrane with the reducing agent followed by flushing with the metallic salt solution. The aforesaid steps, however, insure removal of any gas present in the pores of the membrane and improves the uniformity and completeness of the coating of the pore surfaces.

As will be apparent to one skilled in the art, the nature of the plastic membrane to be impregnated is not critical to the method, provided the membrane has a pore diameter in the range of from about 0.2 to 50 microns. If the average pore diameter is below about 0.2 micron, the pores may become blocked during the impregnation, eliminating their utility. On the other hand, if the pores are above about 50 microns, while the internal surfaces can still be coated according to the present invention, the full benefit of the novel method will not be realized. Further, the thickness of the membrane is not critical but preferably should be between about 3 to 50 mils (0.005–0.050 inch). As is apparent, if relatively thick membranes are employed, the length of the vibratory step should be increased.

The porous plastic membrane to be impregnated with the catalytically activating metal can be substantially any polymeric substance having either hydrophilic or hydrophobic properties, depending upon the ultimate use of the structure. Suitable plastic membranes are exemplified by membranes of polyvinylchloride, fluorinated hydrocarbons such as polytetrafluoroethylene, polyethylene, polystyrene, polypropylene, polymethylmethacrylate, and the polyurethanes.

The catalytic metals used to impregnate the porous plastic membrane are not critical, it only being necessary that the metal form a salt solution capable of being reduced. The ultimate choice will depend upon the desired use of the impregnated polymer structure. For example, if the structure is to be used as a fuel cell electrode, a metal such as platinum, palladium, and nickel, which will conduct an electrical current and support an electrochemical reaction, should be selected.

Moreover, the reducing agent to be employed in the present invention is not critical and depends upon the metal salt employed. It has been found, however, that aqueous solutions of hydrazine and formaldehyde are highly desirable.

Having described the invention in general terms, a preferred embodiment will be set forth with reference being made to the drawing.

EXAMPLE

A polyvinylchloride membrane having an average pore diameter of 12 microns was impregnated with platinum to provide a structure as illustrated in FIG. 2. The impregnation was accomplished using the apparatus shown in FIG. 1. The reducing agent was a 20 percent aqueous hydrazine solution whereas the platinum solution contained 6.0 grams platinum, 90 milliliters 5 molar ammonia, 1 gram ethylenediaminotetraacetic acid, and sufficient water to make one liter of solution. The polyvinylchloride membrane 11a is placed in holder 11 and the cell filled with the 20 percent aqueous hydrazine solution. The membrane is impregnated at a low vacuum for approximately 10 minutes and the full cell is thereafter flushed with water. Platinum-salt solution is then placed in the full cell and again a low vacuum is applied for approximately 10 to 15 minutes with the vacuum being pulled first from one half cell and then the other. The full cell is again flushed with water. Fresh solutions are added to the respective half cells with aqueous hydrazine being in one half cell and the platinum-salt solution being in the other half cell. The complete cell is placed in an ultrasonic vibrating device and vibrated approximately 10 minutes at a temperature of 40 to 50° C. The solutions of the respective half cells are reversed at the end of 10 minutes and the vibration continued an additional ten minutes. The membrane is removed from the holder and platinum black is deposited on one side of the membrane at 100 milliamps per square centimeter.

In order to demonstrate the utility of the membranes of the present invention, the membrane impregnated as described above was backed up against a conductive metal screen and tested as a half cell in a 50 percent phosphoric acid electrolyte at 100° C., using hydrogen as the reactant, versus a standard calomel electrode. The following data was obtained:

| Current density (ma./cm.$^2$) | Potential v. s.c.e. (volts) | Polarization (mv.) |
|---|---|---|
| 0 | −0.110 | 0 |
| 37 | −0.073 | 37 |
| 78 | −0.029 | 81 |
| 150 | +0.082 | 192 |

As is apparent, the membranes prepared by the method of the instant invention have excellent utility in constructing a fuel cell electrode. It was found that the structures, in addition to having excellent electrochemical activity, demonstrated excellent endurance in the environment of a fuel cell electrode.

While various modifications of the invention are described, it should be appreciated that the invention is not restricted thereto. The invention embraces all modifications which will be apparent to one skilled in the art and which come within the scope of the appended claims.

It is claimed and desired to secure by Letters Patent:

1. A method for coating the internal pore surfaces of a porous plastic membrane having an average pore diameter of from about 0.2 to 50 microns with a catalytically activating metal to obtain a substantially uniform coating of the metal throughout the porous structure without causing blocking of, or complete closing of said pores comprising (1) flooding one major surface of the membrane with a solution of a metal salt of the catalytic metal and simultaneously flooding the second major surface of the membrane with a reducing agent for said solution of metal salt, and (2) causing said solution of said metal salt and said reducing agent to react to form said catalytically activating metal on the internal pores of said matrix.

2. The method of claim 1 wherein the process includes the step of vibrating the membrane while the membrane is in contact with said solution of said metal salt and said reducing agent.

3. The method of claim 2 wherein the membrane is flooded at both major surfaces with a solution of the reducing agent followed by flooding at both major surfaces with a solution of the metal salt prior to step 1.

4. The method of claim 2 wherein the reducing agent is an aqueous solution of hydrazine.

References Cited

UNITED STATES PATENTS

| 2,464,568 | 3/1949 | Flynn et al. | |
| 3,178,311 | 4/1965 | Cann | 117—160 |
| 3,351,487 | 11/1967 | Levine et al. | 117—227 |
| 1,318,740 | 10/1919 | Fessenden. | |
| 2,872,312 | 2/1959 | Eisenberg | 117—54 X |
| 2,968,335 | 1/1961 | Monaco et al. | 117—68 X |
| 2,975,079 | 3/1961 | Ervin et al. | 117—68 X |
| 3,235,473 | 2/1966 | Le Duc. | |
| 3,326,719 | 6/1967 | Beltzer et al. | 117—47 X |

RALPH S. KENDALL, Primary Examiner

U.S. Cl. X.R.

117—119, 160, 227; 118—412; 136—86, 120